United States Patent Office 2,866,722
Patented Dec. 30, 1958

2,866,722

PROCESS FOR THE PRODUCTION OF FOAMED URETHAN COATINGS

Herbert Gensel and Wilhelm Tischbein, Leverkusen, and Erwin Windemuth, Leverkusen-Bayerwerk, Germany, assignors to Farbenfabriken Bayer Aktiengesellschaft, Leverkusen, Germany, a corporation of Germany No Drawing. Application May 20, 1955
Serial No. 510,017

8 Claims. (Cl. 117—104)

This invention relates to a process for coating substrates with plastic materials and more particularly to a process for coating sheet materials, fabrics, textiles, foils and the like with solid and foamed plastic materials.

It is known that sheet materials, fabrics, textiles, foils etc. can be provided with plastic coatings or compositions. The present invention is concerned with a particular process for applying plastic coatings derived from two or more components which react to form same by polycondensation or polyaddition, and in some instances with subsequent cross-linking.

According to the invention, one of the reactants, such as a reaction component or an accelerator, is brought by spraying or simultaneous spraying and vaporization into contact with, and caused to react with the other reactant which has been previously applied to the support. Tertiary amines, for example, can be used in the usual manner as accelerators.

The process is particularly suitable for the production of plastic coatings from polyisocyanates and polyesters containing hydroxy groups; either the polyester or the polyisocyanate is applied by spraying, or simultaneous spraying and vaporization, while the other component is applied to support in the conventional manner. The second component can be colored, provided with fillers or pigmented; it can also contain an accelerator. In addition, thin coatings of foam-like structure can be obtained if the accelerator is added to the polyester together with the emulsifier and water, and the diisocyanate is thereafter caused to react by spraying it onto the coatings. Instead of using the spraying method, one of the reaction components can be simultaneously sprayed and vaporized. The spraying and vaporization can take place in the cold or even in the hot state. The component to be sprayed can be mixed with solvents or any suitable gases, for example nitrogen as a spraying agent, in order to avoid a violent reaction. In other cases, a spontaneous reaction may of course be particularly desirable, for example where it is desired to form thin foamed coatings.

The hydroxyl polyesters employed according to our invention are prepared from dihydric or polyhydric alcohols and dicarboxylic acids by thermal condensation at 150–220° C. until an OH-number of 80–450 and an acid number of 2–40 is reached. Dihydric or polyhydric alcohols, for example ethylene glycol, propylene glycol, butylene glycol, hexanediol, hexanetriol, glycerol and trimethylol propane, are suitable for the production of the polyesters, while adipic acid or phthalic acid, inter alia, are used as dicarboxylic acids. By varying the proportions of a mixture of dihydric and polyhydric components it is readily possible to produce polyesters with a varying degree of branching. As diisocyanates to be sprayed or vaporized 1,2,4-toluylene diisocyanate, 1,2,6-toluylene diisocyanate or a technical mixture thereof are preferably used. Tertiary amines can be used as accelerators in the process of the invention, e. g. hexahydrodimethyl aniline or peralkylated triethylene tetramine. If the spraying process is performed in the heat, masked accelerators can also be used, e. g. hexamethylenetetramine, or salts of organic acids with tertiary amines, all of which split off the accelerator when heated.

The process of the invention can be used in the production of coatings on support materials of all kinds. The coatings can be final coatings or ordinary impregnations for an extremely wide range of uses. There is also contemplated, for example, the production of so-called final coatings of such resins, and also oilcloths from any plastics, in which in carrying out or accelerating the reaction either one of the components or the reaction accelerator is sprayed, or sprayed and vaporized.

Moreover, it is to be noted that the ready mixture of the hydroxy polyester and the diisocyanate which is to be applied to the supporting material according to the prior art has a rather short shelf-life. The process of invention, however, allows the first component to be applied at any time before spraying the second component, thereby facilitating the procedure of coating.

Example 1

A sheet material consisting of polyvinyl chloride and plasticizer, initially gelled and applied to cotton or rayon fabric, is coated with a solution of a polyester initially condensed with 2,4-toluylene diisocyanate; and 0.5–1.5% of a 10% accelerator solution (peralkylated triethylene tetramine in 98% butyl acetate). The polyester used for this purpose is prepared from 3 mols of adipic acid, 3 mols of 1,4-butylene glycol and 1 mol of hexanetriol by thermal condensation at 150–220° C. The sheet material is thereafter introduced into a heated chamber, in which 2,4-toluylene diisocyanate is sprayed. A reaction immediately takes place and there is obtained a satisfactory polymerized coating which has good adhesion.

Example 2

The procedure described in Example 1 is repeated, except that the diisocyanate is not only sprayed, but is also simultaneously vaporized by the use of large evaporation dishes.

Example 3

The procedure disclosed in Example 1 is carried out, except that the diisocyanate is sprayed in admixture with nitrogen gas which also serves as spraying agent.

Example 4

7.5 grams of a 10% solution of an accelerator in 98% butyl acetate as set forth in Example 1 are mixed while stirring with 100 grams of the polyester referred to in the same example, the said polyester being pigmented in a weight ratio of 2:1 with titanium dioxide. The mixture is applied in a thin layer to rayon, polyamide material or other supporting material which is then introduced into a heated chamber, in which the diisocyanate is sprayed in admixture with nitrogen gas which also serves as spraying agent. After some time a completely condensed film is obtained.

We claim:

1. A process for producing foamed plastic coatings on a substrate, which comprises initially applying to said substrate a composition comprising a polyester containing hydroxyl groups, an accelerator and water and effecting a foaming reaction with said composition by spraying onto said composition a polyisocyanate.

2. A process as defined in claim 1, in which the foaming reaction between said composition and said polyisocyanate is effected by spraying and vaporization.

3. In a process for producing a plastic coating on a substrate wherein an hydroxy polyester is reacted with at least a polyisocyanate, the improvement which comprises coating said substrate with one reactant, and subsequently spraying the other reactant onto the coated substrate, and effecting chemical reaction of the components of the resulting mixture to form a polyurethane.

4. In a process for producing a plastic coating on a substrate wherein an hydroxy polyester is reacted with a polyisocyanate, the improvement which comprises coating said substrate with said hydroxy polyester, subsequently spraying the polyisocyanate onto the coated substrate, and effecting chemical reaction of the components of the resulting mixture to form a polyurethane.

5. A process for producing plastic coatings on a substrate, which plastic coatings are foamed plastic coatings, which comprises applying to said substrate a composition comprising a polyisocyanate and effecting a foaming reaction with said composition by spraying onto said composition a polyester containing hydroxyl groups.

6. A process as defined in claim 5, in which the foaming reaction between said composition and said polyisocyanate is effected by spraying with a mixture of polyisocyanate and nitrogen gas.

7. A process as defined in claim 5, in which the polyester has been pigmented in a weight relationship of 2:1 with titanium dioxide.

8. In a method for making a laminated structure comprising a cellular polyurethane layer adjacent a substratum by a process comprising reacting an hydroxyl polyester, a polyisocyanate and water together in the presence of an accelerator, the improved method of mixing the said components together and of forming the cellular polyurethane which comprises spraying at least one of the said components onto a mixture of the other components lying on the substratum, and effecting foaming of the mixture.

References Cited in the file of this patent

UNITED STATES PATENTS

| | | |
|---|---|---|
| 2,282,827 | Rothrock | May 12, 1942 |
| 2,430,479 | Pratt et al. | Nov. 11, 1947 |
| 2,602,783 | Simon | July 8, 1952 |
| 2,650,212 | Windemuth | Aug. 25, 1953 |
| 2,657,151 | Gensel et al. | Oct. 27, 1953 |
| 2,786,734 | Evans et al. | Mar. 26, 1957 |

UNITED STATES PATENT OFFICE
CERTIFICATE OF CORRECTION

Patent No. 2,866,722                                       December 30, 1958

Herbert Gensel et al.

It is hereby certified that error appears in the printed specification of the above numbered patent requiring correction and that the said Letters Patent should read as corrected below.

Column 3, line 2, strike out "at least"; line 3, after "with" insert -- at least --.

Signed and sealed this 9th day of June 1959.

(SEAL)
Attest:

KARL H. AXLINE
Attesting Officer

ROBERT C. WATSON
Commissioner of Patents